(12) United States Patent
Hansen et al.

(10) Patent No.: US 11,385,189 B2
(45) Date of Patent: Jul. 12, 2022

(54) BREAK ANALYSIS APPARATUS AND METHOD

(71) Applicant: Belron International Limited, Egham (GB)

(72) Inventors: Mark Hansen, Bristol (GB); Ian Hales, Bristol (GB); Abdul Farooq, Bristol (GB); Melvyn Smith, Evesham (GB); Gwen Daniel, Swansea (GB)

(73) Assignee: Belron International Limited, Egham (GB)

( * ) Notice: Subject to any disclaimer, the term of this patent is extended or adjusted under 35 U.S.C. 154(b) by 0 days.

(21) Appl. No.: 17/106,919

(22) Filed: Nov. 30, 2020

(65) Prior Publication Data

US 2021/0131979 A1  May 6, 2021

Related U.S. Application Data

(63) Continuation of application No. 16/099,288, filed as application No. PCT/GB2017/051316 on May 11, 2017, now Pat. No. 10,852,249.

(30) Foreign Application Priority Data

May 13, 2016 (GB) .................... 1608455

(51) Int. Cl.
 *G01N 21/00* (2006.01)
 *G01N 21/958* (2006.01)
 *G06T 7/00* (2017.01)
 *G06F 17/14* (2006.01)
 *G06T 7/60* (2017.01)

(52) U.S. Cl.
 CPC .......... *G01N 21/958* (2013.01); *G06F 17/14* (2013.01); *G06T 7/0002* (2013.01); *G06T 7/0004* (2013.01); *G06T 7/60* (2013.01); *G01N 2021/9586* (2013.01); *G06T 2207/20036* (2013.01); *G06T 2207/20056* (2013.01); *G06T 2207/20092* (2013.01); *G06T 2207/30164* (2013.01)

(58) Field of Classification Search
 CPC ............... G01N 21/958; G01N 21/896; G01N 2021/9586; G01N 21/8803; G01M 11/00
 USPC ....................................... 356/239.1
 See application file for complete search history.

(56) References Cited

U.S. PATENT DOCUMENTS 6,115,118 A     9/2000  Dunnegan et al.
10,852,249 B2  12/2020  Hansen et al.
(Continued)

FOREIGN PATENT DOCUMENTS

FR   2915721 A1  11/2008
GB   2415776 A    1/2006
(Continued)

OTHER PUBLICATIONS

International Search Report of Patent Application No. PCT/GB2017/051316 dated Jul. 20, 2017.
UK Intellectual Property Office Search Report of Application No. GB10608455.0 dated Nov. 15, 2016.
"Morphological Reconstruction", Rafael C. Gonzalez et al., MATLAB Digest; available at http://www.mathworks.com/tagteam/64199_91822v00_eddins_final.pdf.
(Continued)

*Primary Examiner* — Md M Rahman
(74) *Attorney, Agent, or Firm* — Gordon & Jacobson, P.C.

(57) ABSTRACT

A method and apparatus are disclosed which enable the analysis of a break in a vehicle glazing panel without the attendance of a technician, the method and apparatus utilize capturing an image of the break and processing the image of the break to enable the suitability for repair or replacement of the glazing panel to be determined.

18 Claims, 8 Drawing Sheets

(56) References Cited

U.S. PATENT DOCUMENTS

| | | |
|---|---|---|
| 2006/0025897 A1 | 2/2006 | Shostak |
| 2006/0087049 A1 | 4/2006 | Davies |
| 2007/0067075 A1 | 3/2007 | McMillan |
| 2007/0245956 A1 | 10/2007 | Ruuttu |
| 2008/0094611 A1 | 4/2008 | Davies |
| 2008/0273751 A1 | 11/2008 | Yuan et al. |
| 2010/0268451 A1 | 10/2010 | Choi |
| 2011/0167741 A1 | 7/2011 | Surace et al. |
| 2014/0247348 A1 | 9/2014 | Moore, Jr. et al. |
| 2015/0038173 A1 | 2/2015 | Jackson et al. |
| 2016/0132281 A1 | 5/2016 | Yamazaki et al. |

FOREIGN PATENT DOCUMENTS

| | | |
|---|---|---|
| GB | 2526270 A | 11/2015 |
| WO | WO2015/0173594 A2 | 11/2015 |

OTHER PUBLICATIONS

Closing (morphology), Wikipedia; Jun. 2, 2017, available at https://en.wikipedia.org/wiki/closing_(morphology).
"Computational Geometry in C", Joseph O'Rourke, Cambridge University Press, 2012.
"Multiple View Geometry in Computer Vision", Abstract, Richard Hartley and Andrew Zisserman Cambridge University Press, 2011.
AU Exam Report dated May 19, 2021 of Application No. 2017263145.
EP Search Report dated Dec. 9, 2020 of Application No. EP20201944.
GB Exam Report dated Aug. 10, 2021 of Application No. GB1819662.6.
ID Exam Report dated Dec. 30, 2021 of Application No. PID201809287.
MX Office Action dated Sep. 8, 2021 of Application No. MX/a/2018/013704.
RU Office Action dated May 21, 2021 of Application No. 2018140338/28(067080).

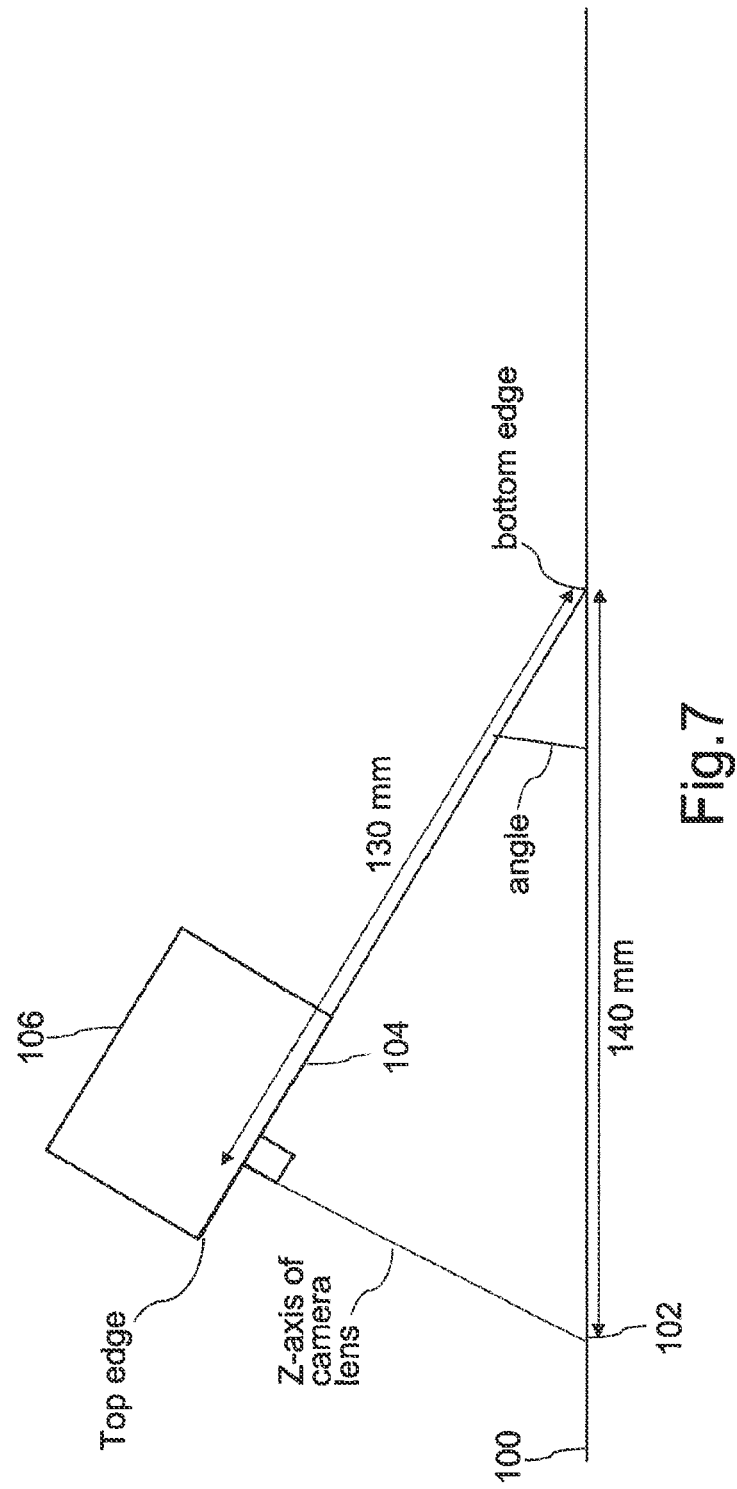

BREAK ANALYSIS APPARATUS AND METHOD

CROSS-REFERENCE TO RELATED APPLICATIONS

This application is a continuation of U.S. application Ser. No. 16/099,288 filed on Nov. 6, 2018, which is the National Stage of International Patent Application No. PCT/GB2017/051316 filed on May 11, 2017, which claims priority from British Patent Application No. GB 1608455.0 filed on May 13, 2016, all of which are hereby incorporated by reference herein in their entireties.

BACKGROUND

Field

This invention relates generally to an apparatus and a method. Particularly, but not exclusively, the invention relates to an apparatus and a method to be used to analyse breaks in vehicle glazing panels. Further particularly, but not exclusively, the invention relates to a method and an apparatus to be used to analyse cracks in glass, particularly a vehicle glazing panel.

State of the Art

When driving the presence of debris and other material on the road can cause such material to be deflected into the path of traffic which, when, such material collides with a windscreen, can cause cracks, breaks or other damage to manifest in such windscreens which may necessitate the need for repair or replacement of the vehicle glazing panel.

For safety reasons and reasons of economy, it is imperative that such work is performed as quickly as possible as these cracks can propagate further into the windscreen due to the influence of cold weather, say, which can cause the crack to grow. This can cause the crack to change from one which needs a minor repair to one which necessitates the need for a full replacement of the windscreen.

An assessment is required as to whether the damage to a vehicle glazing panel can be remedied by repair. If the assessment indicates that repair is not feasible then replacement of the glazing panel will be required.

Aspects and embodiments were conceived with the foregoing in mind.

SUMMARY

Viewed from a first aspect, there is provided a break analysis method for analysing breaks in a vehicle glazing panel, the method comprising: capturing an image of a break in a vehicle glazing panel; processing the image of the break.

Viewed from a second aspect, there is provided a break analysis apparatus for analysing breaks in a vehicle glazing panel, the apparatus comprising: a camera arranged to capture an image of a break in a vehicle glazing panel; a processing module operative to process the image of the break.

Optionally, the apparatus may comprise a mobile computing device which comprises the camera. A mobile computing device is an electronic device which is configured to capture images. This may include a mobile telephone (e.g., a smart phone), a laptop computer, a tablet, a phablet, or a camera. The mobile computing device includes a camera to capture images.

The mobile computing device may also comprise the processing module.

A method or apparatus in accordance with the first and second aspects enables an image of a break in a surface to be used to analyse the break. This removes the need for physical attendance by a technician to perform any analysis on the crack.

The determination of the need for a replacement glazing panel may be based on the processing of the image. Thus, the method may include the step of determining whether or not the glazing panel needs to be replaced, and/or whether the glazing panel is suitable for repair, based on the processing of the image.

The image of the break may be captured at an angle inclined relative to the vehicle glazing panel.

The image may be captured by a mobile computing device held in contact with the surface of the glazing panel, wherein the mobile computing device includes a camera. The mobile computing device may for example be a mobile phone such as a smartphone provided with a camera. The invention may be implemented via a software component for processing image data from the camera in order to determine whether the break can be repaired or replacement is needed. The software component may be downloaded to the device such as for example as a stand-alone app or the like. The software component may comprise an algorithm for making the determination and also preferably display user instructions for how to implement the determination method.

Accordingly according to another aspect the invention comprises a computer implemented method for determining technical information regarding a break present in a vehicle glazing panel, wherein the method includes the step of downloading a software component to a mobile computing device having a camera, the software component arranged to process image information captured via the camera in order to determine whether the break may be repaired or replacement is preferred.

The mobile computing device may be inclined to view the break at a predetermined position in a field of view of the camera. A datum position may be achieved by ensuring that the computing device is inclined to the panel with an edge contacting the panel.

The predetermined position at which the mobile computing device may be inclined to view the break may be indicated by indicia displayed on the camera or on the mobile computing device comprising the camera (for example on a screen).

Additionally or alternatively, the indicia may indicate the centre of the field of view (for example on a screen).

Optionally, the camera or mobile computing device may be initially laid flat on the surface of the glazing panel. The mobile computing device may then be pivoted or tilted away from the glazing panel, wherein at least a portion of the mobile computing device remains in contact with the glazing panel.

Optionally, the camera is positioned in a predetermined position relative to the break before the mobile computing device is pivoted. For example, the method may include aligning a feature of the mobile computing device in a predetermined position relative to the break.

In some embodiments, an edge of the image capture module, such as the top edge, may be aligned adjacent (or immediately below) the lowest point of the break. This means that the initial distance between the camera and the lowest point of the break can be determined using the geometry of the mobile computing device.

The image capture module or mobile computing device may then be pivoted away from the glazing panel, wherein a bottom edge of the mobile computing device remains in contact with the glazing panel. The image of the break is then captured.

The method may include pivoting or tilting the mobile computing device until the break is viewable at a predetermined position in a field of view of the camera.

Optionally, the method includes pivoting the mobile computing device until the break is in the centre of the field of view of the camera.

The method may include using geometric parameters of the mobile computing device and lens parameters of the camera to estimate the parameters of the break. The parameters of the break can include one or more spatial dimensions indicative of the size of the break.

For example, using the above method the geometric parameters of the mobile computing device and the lens parameters of the camera may be used to determine the length of the one or more legs of the break and/or the size (e.g. width/diameter) of the centre of the break.

Geometric parameters of the mobile computing device may be used to determine the angle of rotation (or pivot angle) between the mobile computing device and the glazing panel.

If the estimated size of the break (e.g. length of one the legs of the break) exceeds a given threshold then the method may determine that the glazing panel needs to be replaced. If the estimated size of the break (e.g. length of one the legs of the break) is less than a given threshold then the method may determine that the glazing panel is suitable for repair.

The processing of the image may be based upon geometric parameters of the mobile computing device to capture the image of the break.

The processing of the image may be further based on chip parameters for the camera, and/or mobile computing device.

The processing of the image may generate a set of data points which are used to generate a diameter for the break which may be used to determine the requirement for a replacement vehicle glazing panel.

The method may include outputting a signal or indication indicating whether the glazing panel needs to be repaired or replaced.

The break in the glazing panel may comprise a centre and one or more legs. This break formation is common when a small stone or other object impacts a glazing panel. The one or more legs (or cracks) generally radiate from the centre of the break.

The centre of the break may be substantially circular in shape.

The determination of the need for a replacement or repair of a glazing panel may comprise generating data indicative of a centre of a break and one or more legs of a break.

The method may include identifying a centre of the break and one or more legs of the break.

The method may include generating a scaling factor indicating the relative length of the one or more legs of the break compared to the size of the centre of the break. The size of the centre of the break may be the diameter, width and/or length of the centre of the break.

The method may include estimating the length of the one or more legs of the break (i.e. the absolute length in cm or mm etc.) using the scaling factor. For example, the length of the one or more legs may be estimated by multiplying the scaling factor by a predetermined value.

The predetermined value may be an estimate of the actual (i.e. absolute) size of the centre of the break. This provides the advantage that no calibration object is required, which is at least more convenient for the user.

Thus, the method of the present invention may comprise determining the scale of the image to estimate the length of the one or more legs of the break.

If the estimated length of the one or more legs exceeds a given threshold then the method may determine that the glazing panel needs to be replaced. If the estimated length of the one or more legs is less than a given threshold then the method may determine that the break in the glazing panel is suitable for repair.

The method may comprise outputting a signal indicating that repair of the glazing panel is required if the estimated length of the one or more legs is less than the given threshold.

The method may comprise outputting a signal indicating that replacement of the glazing panel is required if the estimated length of the one or more legs exceeds the given threshold.

It has been found that the size of the centre of the break generally varies less than the length of the one or more legs of the break when comparing different breaks in glazing panels. As such, the predetermined value may be an average, or mode of the measured sizes of the centre of a break in a glazing panel.

Optionally, the estimated of the actual width (or diameter) of the centre of the break (i.e. the predetermined value) may be between 1 mm and 3 mm. A particularly preferred predetermined width (or diameter) of the centre of the break may be 2 mm. These ranges/values have been determined from studies of breaks carried out by the applicant.

The effect of this is that the estimated size of the centre of the break, such as the estimated diameter of the centre of the break, can be used to estimate the length of the legs of the break as the predetermined value can be used to scale between the relative length of the one or more legs relative to the size of the centre of the break and the estimated actual length of the one or more legs of the break.

For example, if we know that the centre of the break is always going to be around 2 mm in width (or diameter) and the generated image data indicates that the legs are twice the length of the diameter of the centre of the break, then the method may comprise multiplying 2 mm by a scaling factor of 2. This estimates that the legs are 4 mm in length. This helps to build a picture, in the data, of the dimensions of the break.

The generated (or estimated) length of the one or more legs may be used to indicate the estimated size of the break. The size of the break may be compared to a threshold parameter to determine the need for replacement of repair of the glazing panel.

If the estimated size of the break exceeds a given threshold then the method may determine that the glazing panel needs to be replaced. If the estimated size of the break is less than a given threshold then the method may determine that the glazing panel is suitable for repair.

The comparison may be between the break threshold parameter and the largest distance across the break.

Optionally, the predetermined estimate of the size of the centre of the break may be dependent upon one or more parameters. The parameters may be input by the user and/or pre-set into the device or processing module. For example, the parameters may include: one or more properties of the glazing panel (such as type, size, etc.), and/or the speed the vehicle was traveling at when the break occurred.

The processing of the image may comprise filtering the image to remove a background portion to identify the break.

Morphological refinement may be applied to the image to remove any clutter from the image and improve the quality of the image data used as the basis for a determination of whether a replacement glazing panel is required.

The method may include cleaning the glazing panel prior to capturing the image of the break. This may assist in removing any dirt that could affect the processing of the image. For example, there is a risk that dirt could be construed as a break by image processing software.

The method may include disabling a flash function of the image capturing module or device before capturing an image of the break. If flash photography is used, then the light may adversely affect the accuracy of the image processing software. For example, the flash may be reflected in the glazing panel which may affect the identification or analysis of the break.

The method may be implemented using computer implemented instructions which, when installed into memory, instruct a processor to implement a method as defined above. A downloadable software component (such as an app) is preferred.

It will be appreciated that any features of the method may be performed using the apparatus of the present invention.

These and other aspects of the present invention will be apparent from and elucidated with reference to, the embodiment described herein.

First and second embodiments of the present invention will now be described, by way of example, and with reference to the accompanying drawings.

BRIEF DESCRIPTION OF THE DRAWINGS

FIG. 7 illustrates an arrangement which may be used to model a crack 102.

DETAILED DESCRIPTION

Figure 1:
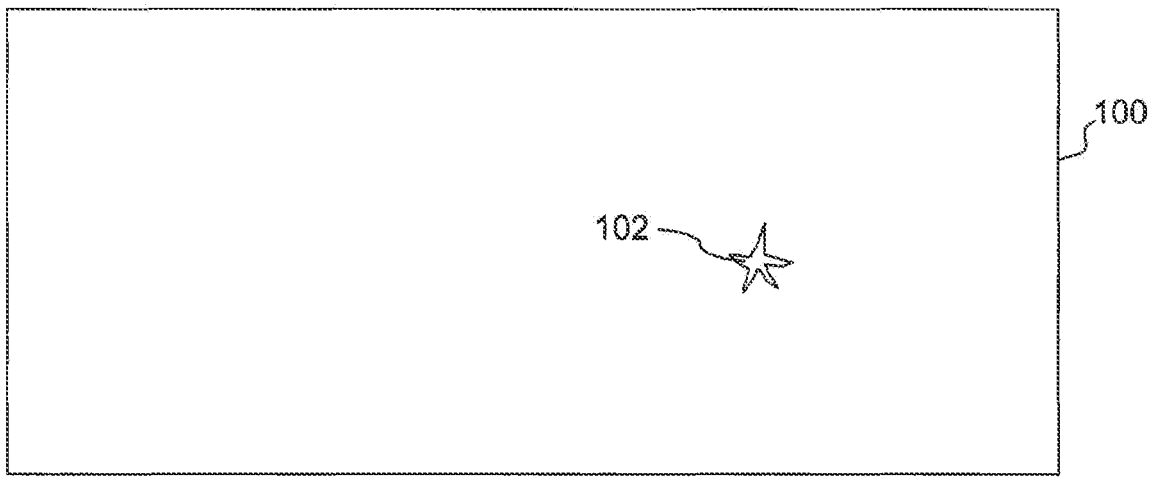
FIG. 1 illustrates a windscreen with a crack.

In a first embodiment, FIG. 1 illustrates a glass windscreen 100 with a crack 102 caused by a stone which had been flicked onto the windscreen. The driver of the car in which the glass windscreen 100 is housed then captures an image of the crack 102 using a mobile telephone 104 which comprises a camera 106 which is used to capture the image of the crack 102. This arrangement is shown from a side perspective in FIG. 2. The focal length of the camera 106 is fixed at less than 100 millimetres to cause the focus of the camera to be tight at a small distance.

Figure 3:
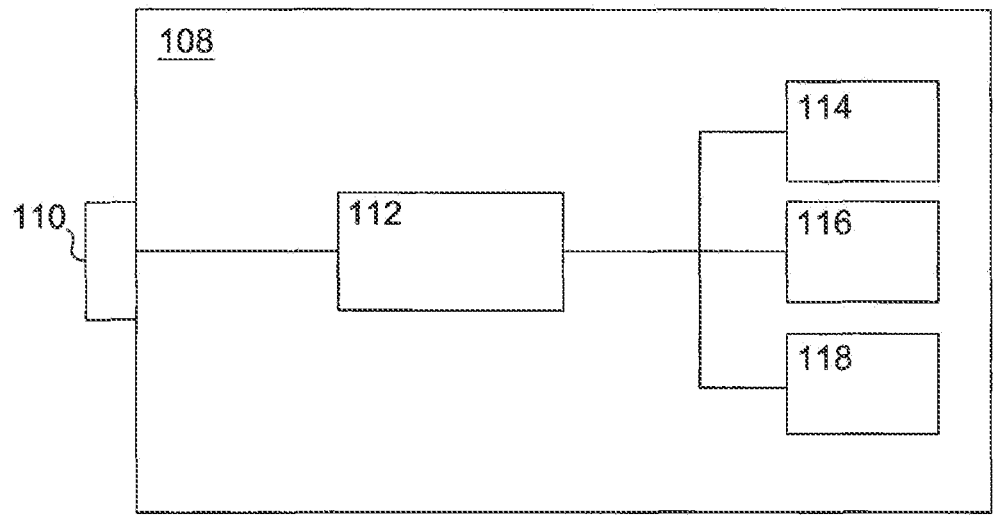
FIG. 3 illustrates a processing module which may be used to analyse the crack in the windscreen of FIG. 1.

The image of the crack 102 is then captured, responsive to user input, and mobile telephone 104 is configured to provide a prompt to the user to request that they indicate that they would like the image to be transmitted from the camera 106 to an image processing module 108 which we will now describe with reference to FIG. 3. This step enables the user to assess the quality of the image themselves so that they may elect to capture another image if they do not consider the image to be clear such as, for example, in inclement weather conditions where condensation may be deposited on the lens of camera 106.

The camera 106 converts the captured image to an array of image data using any suitable method. The camera 106 may save the image data as an exchangeable image file (EXIF) where the lens parameters of the camera are also stored.

That is to say, the camera 106 is an example of an image capture module which is operative to capture the image of the crack 102 and to transmit the captured image in the form of captured image data to the image processing module 108 where it may be processed further to extract details of the crack.

The image processing module 108 may form part of the mobile telephone 104 or it may be geographically distant relative to the mobile telephone 104. The image data is transmitted to the image processing module 108 by any suitable means such as, for example, a data bus or the internet.

In a preferred embodiment the image processing module 108 is implemented as a software component downloaded to the mobile phone. This may be implemented by means of downloading the software component as an app. The software component is capable of processing the image data from the camera to determine whether the break is susceptible for repair or whether replacement of the glazing panel may be required as the preferred solution.

The break analysis module 112 may be a software component downloaded to the mobile phone preferably as a single download in combination with the image processing module 108. A single downloaded software component I preferably arranged to process the image data from the phone camera and analyse the break using one or more algorithms implemented in software.

In one implementation, the captured image data is received by the image processing module 108 at data input interface 110. The image data is then transmitted to the break analysis module 112 which is configured to access a routine library 114 where routines may be stored to perform operations on the captured data throughout the analysis of the captured image data.

The break analysis module 112 is also configured to access a device parameters database 116 where parameters related to the mobile telephone 104 are stored.

The parameters related to the mobile telephone 104 include chip parameters which define the image capture performance of the camera 106 such as, for example, focal length, and sensor size of the lens, and the dimensional parameters of the mobile telephone 104 such as, for example, the length of the mobile telephone 104 and the distance between the top edge of the mobile telephone 104 and the centre of the image of the camera 106.

The break analysis module 112 is also operative to interface with a display module 118 which is operative to display image data transmitted from the break analysis module 112 on a display and to display parametric data transmitted from the break analysis module 112 on a display.

Figure 4:
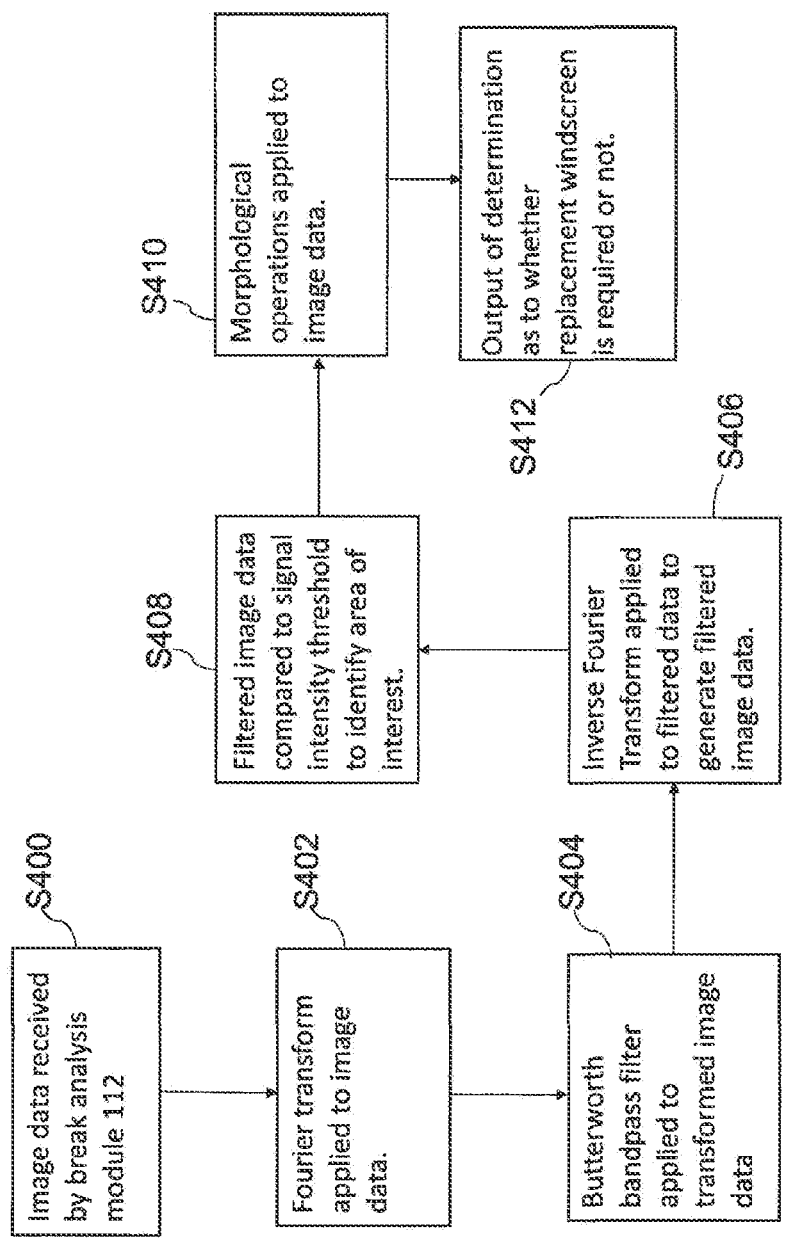
FIG. 4 illustrates a flow chart detailing the steps involved in assessing a crack in the windscreen using the system of FIG. 3.

We will now describe, with reference to FIG. 4, the analysis of crack 102 using the break analysis module 112.

The break analysis module 112 receives the image data in a step S400. The break analysis module 112 then, in a step S402, calls a Fourier transform routine from the routine library 114 and uses the Fourier transform routine to apply a discrete two-dimensional Fourier transform to the image data to produce a transform image as illustrated in FIG. 5A.

Figure 5A:
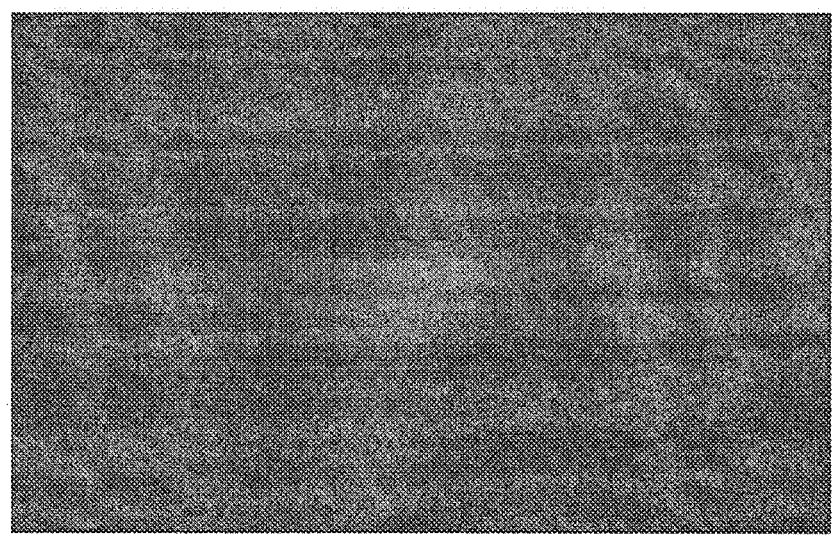
FIG. 5A illustrates an image of a Fourier transform of a crack.

In FIG. 5A we can see the transformed image. FIG. 5A plots spatial frequency against the magnitude of the respective Fourier component. It will be seen that low spatial frequencies occupy the centre of the transformed image and higher spatial frequencies can be seen as we move away from the centre of the transformed image.

Taking a Fourier Transform of the image enables break analysis module 112 to perform analysis of the image in terms of its component spatial frequencies and phase. As will now be described, it enables the removal of the spatial frequencies in which we have no interest and enables us to reconstruct the image we are interested in by retaining the spatial frequencies of interest.

Figure 5B:
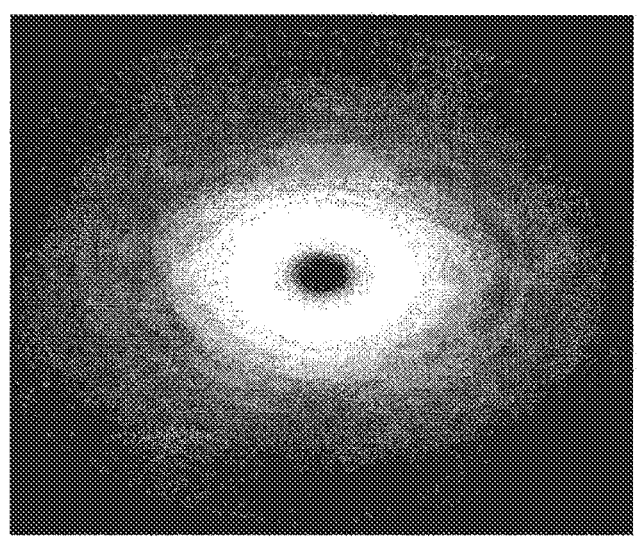
FIG. 5B illustrates the result of a filter applied to the image illustrated in FIG. 5A.

A Butterworth bandpass filter is then applied to the transformed image in a step S404 by break analysis module 112. The mask implemented by the Butterworth bandpass filter is illustrated in FIG. 5B. The Butterworth bandpass filter implements a mask on the transformed image shown in FIG. 5A and removes the low spatial frequencies (shown by the black dot in the centre of FIG. 5B and the very high spatial frequencies (the dark border in the image in FIG. 5B which represents specks of dust and dirt on the image.

The Fourier transform of the image data is then inverted in a step S406 by calling a Fourier Transform Inversion routine from the routine library 114 to perform an inverse discrete two-dimensional Fourier transform on the transformed image data.

The performance of the inverse Fourier transform on the transformed image data transforms the transformed image data from the Fourier domain into the real domain to generate real domain image data. The resulting real domain image data is illustrated in FIGS. 6A and 6B.

Figure 6A:
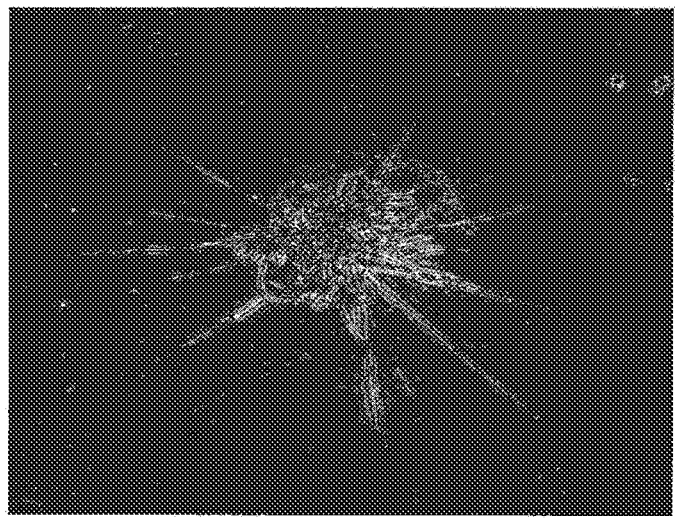
FIG. 6A illustrates delineated image of a crack.
Figure 6B:
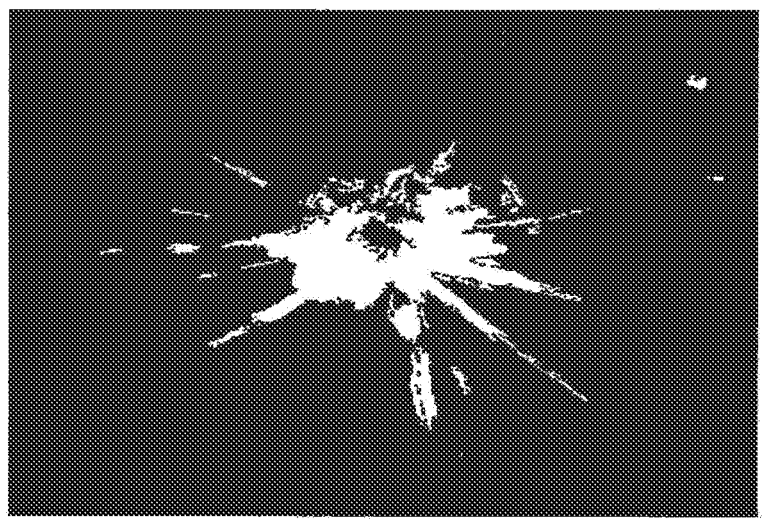
FIG. 6B illustrates the result of a filter applied to the image illustrated in FIG. 6A.

The use of the Fourier transform to produce the image illustrated in FIG. 6B has the effect of isolating the crack from the background.

The real domain image data is compared to a threshold intensity of 4, in a step S408, to delineate the areas of interest more clearly.

FIG. 6A shows the real domain image data without using a Butterworth bandpass filter. FIG. 6B shows the real domain image data after applying the Butterworth bandpass filter to the transformed data illustrated in FIG. 5A and applying thresholding to generate a binary image using a threshold intensity of 4. The Butterworth bandpass filter in this example has a rolloff value of 3.

The upper and lower cutoff frequencies of the Butterworth bandpass filter can be modelled as being linearly dependent on the number of pixels in the longest side of the image (denoted as m) and can be expressed respectively as:

$$Freq_{upper} = \left(\frac{m}{4164}\right) * 500$$

$$Freq_{lower} = \left(\frac{m}{4164}\right) * 120$$

This relationship can be altered using standard trials and numerical experiments.

The image illustrated in FIG. 6B is an image which can include more than just the crack 102. It may also include image data which has passed through steps S400 to S408 but is due to specks of dirt on the windscreen and other artefacts of the processing performed by break analysis module 112.

The use of the threshold intensity of 4 to generate the binary image shown in FIG. 6B helps to show the areas of interest more clearly. The image shown by the real domain image data illustrated in FIG. 6B highlights the crack—including the central crack area—which is an area of low spatial frequency.

As can be seen the Fourier approach does a very neat job of isolating the crack region from the cluttered background assuming that it is in focus and the background is not.

The break analysis module 112 can then call a morphology routine from the routines library 114 to remove any clutter from the image illustrated in FIG. 6B in a step S410.

The morphology routine perform is several operations on the image illustrated in FIG. 6B. This image is a binary image. Regions of black are zero-valued and regions of white are valued at non-zero. The value of the pixels is stored in the memory of the break analysis module 112 and is the result of the processing in steps S400 to S408.

The first of these operations is a fill-in operation which uses morphological reconstruction to fill in pixel sized regions of black that are surrounded by regions of white with white by replacing the zero value with a non-zero value in accordance with the process set out in reference [1].

The second of these operations is a clean-up operation which discards very small non-zero valued regions. Very small non-zero valued regions are defined as non-zero valued regions which occupy an area less than the square of (largest dimension of image/500). The largest dimension of the image can be determined by the break analysis module simply by comparing the length of the width of the image with the length of the image.

The first morphological operation is then repeated to fill in any pixel sized regions of black that are surrounded by regions of white that have been generated by the second morphological operation. This is a third morphological operation.

A fourth morphological operation is then performed to join up any legs in the image of the crack 102 which have gaps in them. This is implemented using a morphological closing operation as described in reference [2]. An erosion is performed followed by a dilation by making use of a disk shaped structuring element with a radius of (largest dimension of image\5312) multiplied by 20. The value of 20 has been determined empirically and may change. This value can be determined without any undue burden for different image resolutions.

The first morphological operation is then repeated to fill in any pixel sized regions of black that are surrounded by regions of white that have been generated by the fourth morphological operation. This is the fifth morphological operation.

A sixth morphological operation is then performed to discard any small non-zero regions. Small regions are defined as regions with an area equal to the square of (largest dimension of image/100).

A seventh morphological operation is then performed to remove any disconnected objects in the image. Disconnected objects of interest are objects that are further away than ¾ of the radius of the largest object nearest the centre of the image. This means that legs of the crack that are still disjointed are included but superfluous artefacts are included. The seventh morphological operation is implemented by finding, for each remaining region in the image, the centroid, i.e. the centre of mass of the image, and the length of the major axis of the region. An additional weighting is assigned to each region area based on how close the centroid is to the centre of the image.

The weighting $w=1/d^2$ where d is the Euclidean distance between the centroid and the centre of the image. The largest region, closest to the centre of the image is selected, and its major axis length is used to set a radius (or % the major axis length from its centroid) outside of which any regions are discarded. That is to say, the morphology routine and the centroid to boundary calculations are configured to retain all "blobs" within a distance from the centre of the crack of the radius of the largest object in the image plus half of that radius to ensure that any discontinuities in the crack 102 are not lost.

The image data, after the morphology has been applied to refine the image data, can then be used to determine the dimensions of the crack 102.

The break analysis module 112 applies further edge detection, morphology, blurring and thresholding to determine the centre of the crack 102.

It has been observed through experimentation that the centre of a crack is usually around 2 mm in diameter. The break analysis module 112 is operative to, using the refined image data and the data which results from the determination of the centre of the crack 102, estimate the length of the legs of the crack 102 and determine a proportional value which characterises the length of the legs compared to the diameter of the centre of the crack 102, that is a scaling factor for the legs compared to the centre of the crack 102. Using the observation that the centre of the crack is usually 2 mm, the scaling factor can then be used to determine the length of the legs. This provides uncalibrated analysis of the size of a crack 102.

The determined length of the legs can then be used to approximate the size of the crack 102 and enables the break analysis module 112 to output a determination of whether a replacement windscreen will be necessary or whether repair will be sufficient as it is the size of a crack which is important in making this determination and by comparing the size of the crack 102 to a repair/replacement threshold the break analysis module 112 can automate this determination. The break analysis module 112 will output this determination to the display module 118.

The output, i.e. whether a replacement windscreen is needed, or not, is then displayed using display module 118 in a step S412.

The use of an observed estimate of the centre of a crack to estimate the size of the legs of a crack, which relies on the assumption of a degree of radial spikeyness in a crack, means that an image can be taken of a crack and used to analyse the crack without any calibration at the scene to provide a scale for the crack 102.

This method enables an analysis of the crack to be performed in a wide range of conditions and without the attendance of a technician.

In a second embodiment, we now describe how to derive parameters of the crack 102 using the parameters of the mobile telephone 104 and the lens of the camera 106. This can assist in correcting for any influence that the angle has on the image.

The second embodiment can be combined with the first embodiment without departing from this disclosure.

Figure 2:
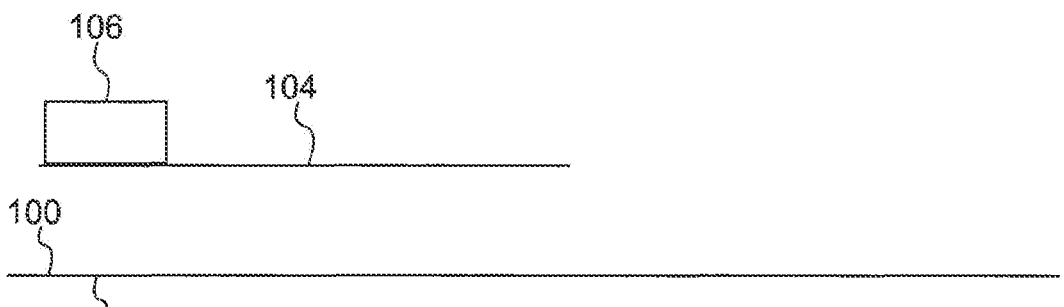
FIG. 2 illustrates the use of a camera to capture an image of a crack.

The arrangement illustrated in FIG. 2 may enable the dimensions of the crack to be estimated using the chip parameters of the camera 106 and the geometric parameters of the mobile telephone 104.

In order to calculate the angle of rotation (or pivot or tilt angle) of the mobile telephone 104 relative to the windscreen, we can use the geometric parameters of the mobile telephone 104.

In positioning the crack 102 in the centre of the field of view of the lens of the camera 106 it enables a right angled triangle to be drawn. This is described with respect to FIG. 7.

After the crack 102 has been discovered, the mobile telephone 104 is laid flat on the windscreen with the top edge at the base of the crack 102. This means that the distance between the bottom edge of the mobile telephone 104 and the base of the crack is equal to the length of the mobile telephone 104. The mobile telephone 104 is then inclined from the bottom edge of the mobile telephone 104 until the crack 102 is in the centre of the field of view of camera 106. Indicia may be provided on the display of mobile telephone 104 to indicate the centre of the field of view.

The distance between the bottom edge of the mobile telephone 104 and the lens of the camera 106 can be retrieved from device parameters database 116. There is therefore formed a right angled triangle defined by the angle of rotation between the bottom edge of the mobile telephone 104 and the windscreen 100, the z-axis of the camera lens and the distance formed between the bottom edge and the base of the crack.

We now describe how the geometric parameters of the mobile telephone 104 and the lens parameters can be used to estimate the parameters of the crack.

An image of the crack is captured consistently with the process described above in that the mobile telephone 104 is rotated until the crack 102 is in the centre of the field of view of camera 106.

This enables a right angled triangle to be formed by the z-axis of the camera lens, the distance formed between the bottom edge and the base of the crack and the length between the bottom edge and the camera lens.

Figure 8:
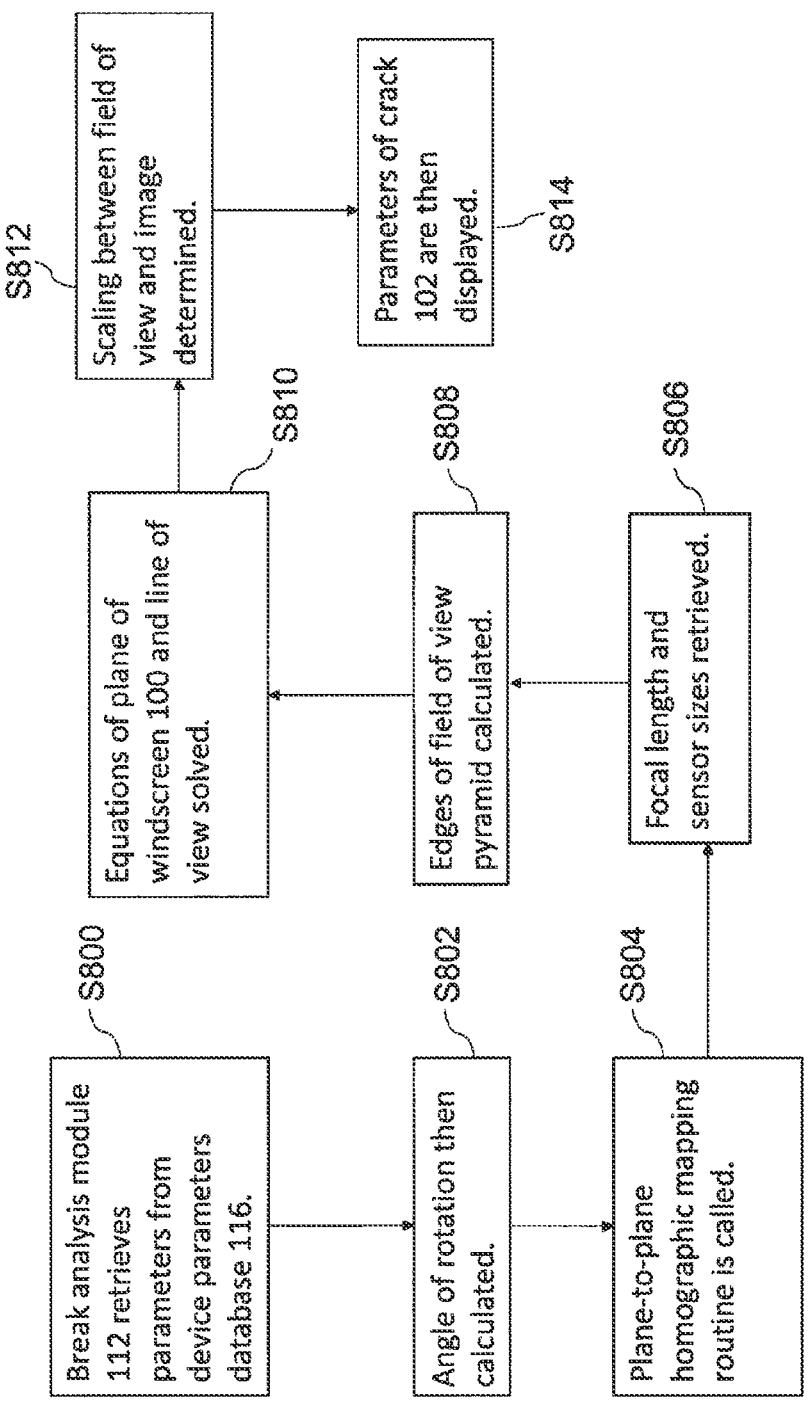
FIG. 8 illustrates the steps involved in generating break parameters.

With reference to FIG. 8, we describe how the geometry of the mobile telephone 104 and the lens parameters can be used to estimate the parameters of the break.

In step S800, break analysis module 112 retrieves the distance formed between the bottom edge of mobile telephone 104 and the base of the crack (i.e. the length of mobile telephone 104) and the length between the bottom edge of the mobile telephone 104 and the camera lens from the device parameters database 116. The angle of rotation of mobile telephone 104 can then be calculated in a step S802 using the cosine relationship between the distance formed between the bottom edge and the base of the crack and the length between the bottom edge and the camera lens.

We then need to use the cameras parameters to derive plane-plane homographic mapping between the pixels of the camera and the real-world spatial dimensions of the image. A plane-to-plane homographic mapping routine is then called from the routines library 114 in a step S804 to derive the real-world spatial dimensions of the image.

The derivation of the homographic map to provide the real-world spatial dimensions of the image is based upon the "pin-hole camera model" where a camera thinks of the view area of the camera as a rectangular based cone expanding out relative to the lens of the camera 106. This is illustrated schematically in FIGS. 9A and 9B.

Figure 9A:
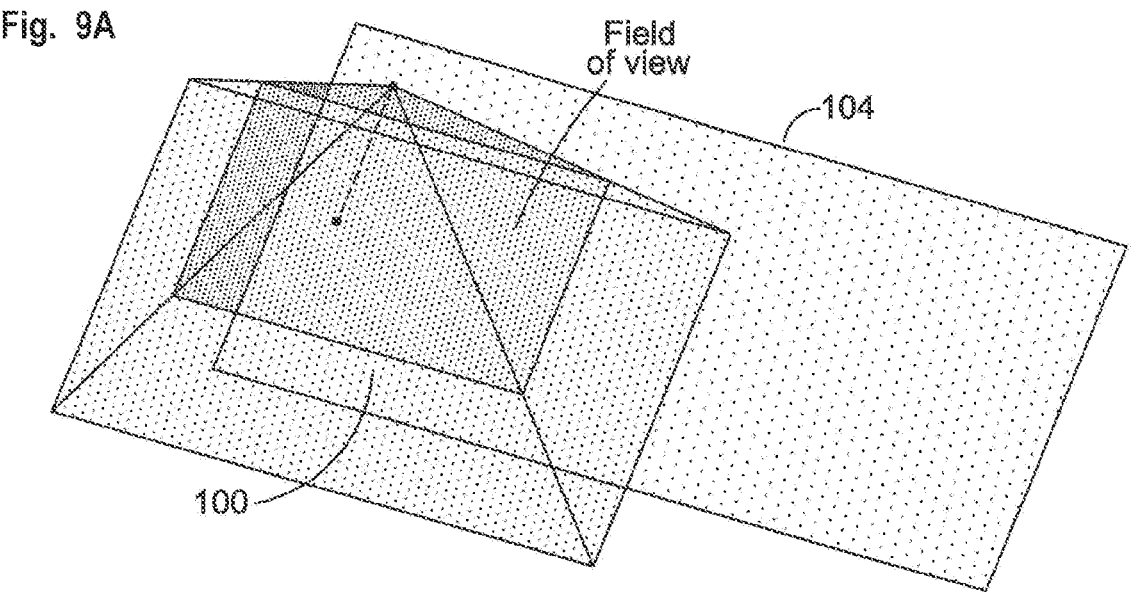
FIG. 9A schematically illustrates the field of view of a camera with a bird's eye view of a windscreen.

FIG. 9A is for illustration only and illustrates the case where the mobile telephone 104 is located directly above the windscreen 100. That is to say, the camera 106 provides a bird's eye view of the windscreen 100. In this instance the view area A1 is a rectangle and each pixel occupies the same amount of real-world space (in millimetres).

Figure 9B:
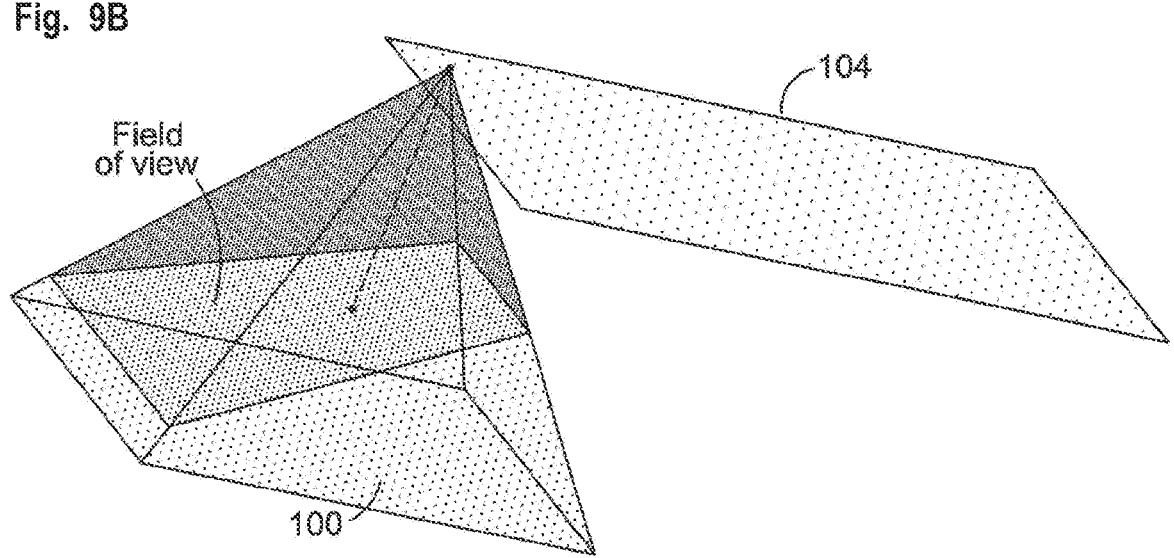
FIG. 9B schematically illustrates the field of view of a camera with an inclined view of a windscreen.
Figure 10:
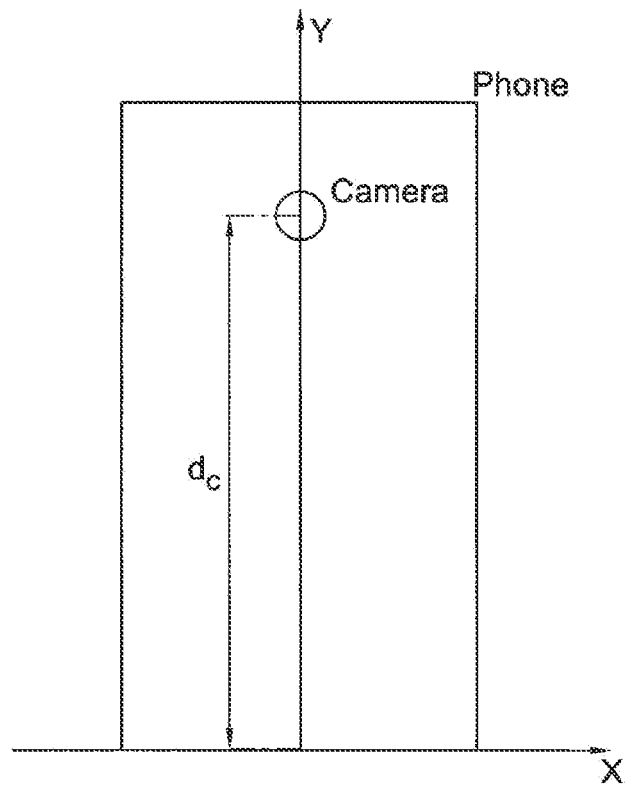
FIG. 10 illustrates how a camera may be modelled in order to use the parameters of the camera to analyse the crack.

In this instance, and as illustrated in FIG. 9B, the mobile telephone 104 is at an angle relative to the windscreen 100. The angle was calculated in step S802. The view area A2 then becomes a trapezium which means that pixels close to the camera represent fewer millimetres than pixels that are further away.

We describe the theoretical basis for how the plane-to-plane homographic map is derived but it will be understood that this will be implemented numerically using routines that will be available to the break analysis module 112 using the routines made available using the routines library 114.

Consider a rectangular image sensor which forms part of camera 106 and a sensor angled from a flat plane by an angle of rotation θ, the area observed by the sensor maps to an isosceles trapezium. The width of the bases of this trapezium are directly dependent upon θ. Using the plane-to-plane homographic mapping routine we can use this principle to numerically estimate the parameters of the crack 102 using the knowledge of the pixels on the camera 106.

We define a 3D rotation matrix, about the x-axis, as a function of θ, as:

$$R_x(\theta) = \begin{bmatrix} 1 & 0 & 0 \\ 0 & \cos\theta & -\sin\theta \\ 0 & \sin\theta & \cos\theta \end{bmatrix}.$$

It will be understood that θ is the angle of the mobile telephone 104 with respect to the windscreen. We can define an origin in Cartesian x, y, and z dimensions at (0,0,0), i.e., the world origin. This is the point in the middle of the base-edge of the mobile telephone 104 which is aligned with the x-axis. The y-axis of this coordinate system is then directed vertically from the base to the top of the phone. If we assume, for simplicity and without loss of generality, that the camera lies upon the y-axis, at some distance $d_c$ from the base of the phone. The camera centre is therefore defined as:

$$\hat{c} = (c_x, c_y, c_z)^T,$$
$$= (0, d_c, 0)^T.$$

The focal length and the vertical and horizontal sensor sizes of the lens of the camera 106 can then be retrieved from device parameters database 116 in a step S806. These parameters may be called chip parameters. This enables us to calculate the area of view from the camera. The area of view is defined by two quantities which are called the horizontal and vertical angle of view (respectively denoted as $\alpha_H$ and $\alpha_V$) and they are defined by the following equations:

$$\alpha_H = \frac{S_x}{2f}$$

$$\alpha_V = \frac{S_y}{2f}$$

where $s_x$ and $s_y$ are the horizontal and vertical sensor size and f is the focal length.

Having calculated the horizontal and vertical angle of view, break analysis module 112 uses the plane-to-plane homographic mapping routine to calculate the edges of the view pyramid to provide us with a field of view on the windscreen 100 in a step S808. This provides with the trapezium illustrated schematically in FIG. 9B, i.e., the trapezium that we need to correct to compensate for the differing amounts of space that are occupied by the pixels further from the lens relative to the pixels nearer to the lens. That is to say, we need to scale the trapezium to ensure that the proceeding calculations attribute equal amounts of real-world space to each pixel.

This is modelled in the plane-to-plane homographic mapping routine used by the break analysis module 112 by a line, i.e. a ray, which extends from the lens along the line of view between the lens and the crack 102. This line will intersect the plane represented by the windscreen—that is, the plane-to-plane homographic mapping routine is modelled as a plane.

In step S810, the plane-to-plane homographic mapping routine calls a numeric solver routine from the routines library 114 to solve the simultaneous equations which define the plane of the windscreen and the line extending from the lens along the line of view between the lens and the crack 102. The plane-to-plane homographic mapping routine is programmed under the assumption that the plane defining the windscreen 100 is flat and the camera 106 is tilted with respect to it. This provides the intersection between the line extending from the lens along the line of view and the plane of the windscreen 100.

Theoretically, this can be expressed as the calculation of the rays emanating from the point at the centre of the camera through the corners of the sensor/image-plane and onto the windscreen which forms the aforementioned trapezium.

We first obtain the intersection of the rays with a plane, parallel to the image plane, at unit distance, given horizontal and vertical viewing angles of $\alpha_H$ and $\alpha_V$ respectively as defined above.

There are four rays, one for each corner of the rectangular sensor. The minimum and maximum x values can be defined as:

$$x_{min} = -\tan\left(\frac{\alpha_h}{2}\right)$$

$$x_{max} = \tan\left(\frac{\alpha_h}{2}\right)$$

Similarly, we can define the minimum and maximum y values as:

$$y_{min} = -\tan\left(\frac{\alpha_v}{2}\right)$$

$$y_{max} = -\tan\left(\frac{\alpha_v}{2}\right)$$

We can then define the corners of the rectangular sensor as:

$$x_{tl} = (x_{min}, y_{min}, -1)^T$$

$$x_{tr} = (x_{max}, y_{min}, -1)^T$$

$$x_{br} = (x_{max}, y_{max}, -1)^T$$

$$x_{bl} = (x_{min}, y_{max}, -1)^T.$$

Normalising these coordinates by their magnitude provides us with the direction of the 4 rays. We define the ray direction for each of these coordinates as:

$$x_i^\infty = \frac{x_i}{\|x_i\|}, \quad i \in (tl, tr, br, bl).$$

If we suppose that the phone is rotated, in the x-axis, by θ, we can calculate that the camera-centre's position is now:

$$\hat{c} = (\hat{c}_x, \hat{c}_y, \hat{c}_z)^T,$$
$$= R_x(\theta) \cdot (0, d_c, 0)^T$$

This enables us to define the direction of the rays as:

$$\hat{x}_i^\infty = R_x(\theta) \cdot x_i^\infty, \quad i \in (tl, tr, br, bl).$$

This gives us the rays in Cartesian coordinates with a known point of intersection with the plane parallel to the image plane, and we know that this intersection occurs only once. This provides a trapezium indicating the field of view in the real world.

We define the corners of the trapezium as:

$$v_i, i \in (tl, tr, br, bl)$$

We calculate the vertices of the trapezium using the line plane intersection formula described in reference [3].

We know that the normal to the windscreen plane is the vector n=(0,0,−1) and that it lies on the world origin which means that the intersection formula simplifies to:

$$t = \frac{-\hat{c}_z}{n \circ \hat{x}_i^\infty},$$

$$v_i = \hat{c} + t\hat{x}_i^\infty, \quad i \in (tl, tr, br, bl).$$

Where the points $v_i$, i∈tl, tr, br, bl) define the vertices of the trapezium that we need to define the homographic mapping H from the image-plane to the plane in the real-world using the four-point correspondence technique between the trapezium vertices and the image coordinates:

$$u_{tl} = (0,0)^T$$

$$u_{tr} = (h,0)^T$$

$$u_{br} = (h,w)^T$$

$$u_{bl} = (0,w)^T,$$

where w is the width of the image and h is the height of the image. The algorithm which discusses how this homographic map is obtained is discussed in reference [4].

The height of the camera above the windscreen can be calculated by the break analysis module 112 using the Pythagoras theorem as the distance formed between the bottom edge of mobile telephone 104 and the base of the crack (i.e., the length of mobile telephone 104) and the length between the bottom edge of the mobile telephone 104 and the camera lens have been retrieved from the device parameters database 116 in step S800 and are still in the memory of the break analysis module 112.

The output from step S810 is the trapezium of view in the real-world ($X_1$, $X_2$, $X_3$, $X_4$). A comparison between the parameters ($X_1$, $X_2$, $X_3$, $X_4$) and the corners of the captured image on the windscreen (performed by break analysis module 112 in step S812) provide the scaling that is needed to map the location of the pixels of camera 106 to locations in millimetres on the field of view on the windscreen 100. This provides us with the plane-to-plane homographic map. The scaling is in the form of a 3×3 matrix which represents scale, rotation, skew, and translation between the field of view of the camera and the windscreen 100.

The plane-to-plane homographic map enables the correction of the effect of the perspective on the captured image and the conversion from pixel dimensions to millimetres which enables the break analysis module 112 to derive dimensional parameters for the crack 102.

The plane-to-plane homographic map is a matrix maps the two-dimensional image plane of the camera 106 onto a plane representing the windscreen.

The output from the plane-to-plane homographic map provides an orthorectified mask, in millimetres, indicating the location and shape of the crack.

Responsive to this output from the plane-to-plane homographic map, which will, as will be understood, the output from the plane-to-plane homographic mapping routine, the break analysis module 112 calls a convex hull calculation routine from the routines library 114. The locations in millimetres on the field of view of the windscreen are provided to the convex hull calculation routine from the routines library 114.

A convex hull is, in summary, a space which covers each of the locations in millimetres on the field of view. The output from the convex hull calculation routine is data which can be expressed, in simple terms, as a "blob" which will be the same size as the detected crack 102. This enables analysis to be performed on the detected crack 102 using the blob.

The break analysis module 112 then calls a smallest-circle routine from the routines library 114 which implements a numerical solution to the smallest circle problem for the convex hull which is output from the convex hull calculation routine. This module outputs the smallest circle which encloses each of the points in the convex hull and therefore provides a minimum radius for the crack 102.

The data representing the convex hull, the data representing the solution to the smallest circle problem for the convex hull and the calculated radius for the crack are each stored by the break analysis module 112 in storage which is either local to the processing module 108 or remote relative to the processing module 108.

That is to say, break analysis module 112 has used the geometric parameters of the mobile telephone 104 and the parameters of the camera 106 to generate a radius for the crack 102.

The parameters and the circle output from the smallest circle routine can then be displayed using display module 118 in a step S814.

Figure 11:
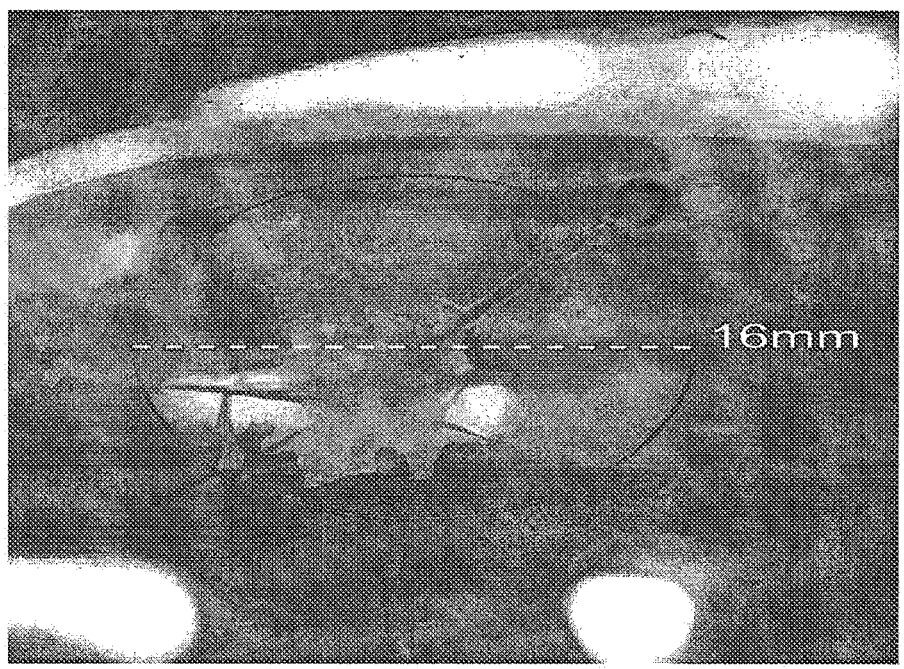
FIG. 11 illustrates an image which is output from the system to determine the size of a crack in a windscreen.

An example image which may be provided by the display module 118 is illustrated in FIG. 11. In this instance the diameter of the smallest circle is indicated as 16 mm, which means a radius of 8 mm. The estimated largest crack diameter in this case is 16 mm. The effect here is that a minimum size for the crack is estimated and can be used to determine the necessity for a replacement windscreen.

The estimated radius can be compared to a replacement/repair threshold by the break analysis module 112 to determine whether the crack 102 requires replacing or whether repair will be sufficient.

The presence of a case on the mobile telephone 104 is likely to introduce an error into the measured parameters as this will add to the length of the mobile telephone 104 but the error is generally around 3%. A 3% error margin is built into the calculations of the break analysis module 112 and provided on a display by the display module 118.

It is also possible that the distance between the base of the mobile telephone 104 and the camera 106 will not be available from device parameters database 116. In this instance we can estimate the parameter to improve the robustness of the described method.

We can use an inclinometer built into mobile telephone 104 to obtain the angle of the mobile telephone when the image of the crack 102 is being captured. This can be used to calculate the height h using the equation:

$$h = l * \sin(\theta)$$

where l is the length of the mobile telephone 104 and the angle $\theta$ is the angle obtained from the inclinometer.

Similarly, the phone angle could be estimated using the angle of view, the image resolution, and the sensor size.

As describe in relation to the first technique, in a preferred embodiment the image processing module 108 is implemented as a software component downloaded to the mobile phone. This may be implemented by means of downloading the software component as an app. The software component is capable of processing the image data from the camera to determine whether the break is susceptible for repair or whether replacement of the glazing panel may be required as the preferred solution.

The break analysis module 112 may be a software component downloaded to the mobile phone preferably as a single download in combination with the image processing module 108. A single downloaded software component I preferably arranged to process the image data from the phone camera and analyse the break using one or more algorithms implemented in software.

The break analysis module 112 is operative to provide an alert on display as to whether a full windscreen replacement is required based on the radius of the smallest circle. If crack 102 is above a specified threshold, then the break analysis module 112 will indicate the need for a windscreen replacement or not. The alert may be displayed on a display of mobile telephone 104.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

REFERENCES

[1] http://www.mathworks.com/tagteam/64199_91822v00_eddins_final.pdf
[2] https://en.wikipedia.org/wiki/closing_(morphology)
[3] Joseph O'Rourke "Computational Geometry in C", Cambridge University Press, 2012
[4] Richard Hartley and Andrew Zisserman "Multiple View Geometry in Computer Vision", Cambridge University Press, 2011.

What is claimed is:

1. A method for analyzing breaks in a vehicle glazing panel, the method comprising:
   capturing an image of a break in a vehicle glazing panel; and
   processing the image of the break;
   wherein the image is captured by a mobile computing device having a camera, and wherein the mobile computing device is held in contact with a surface of the vehicle glazing panel and inclined to the surface of the vehicle glazing panel to view the break at a predetermined position in a field of view of the camera whilst the mobile computing device is held in contact with the surface of the vehicle glazing panel.

2. The method according to claim 1, further comprising:
   determining the need for a replacement or repair of the glazing panel based on the processing of the image.

3. The method according to claim 1, wherein:
   the image of the break is captured at an angle inclined relative to the vehicle glazing panel.

4. The method according to claim 1, wherein:
   the predetermined position is indicated by indicia displayed on the mobile computing device.

5. The method according to claim 1, further comprising:
   placing the mobile computing device flat on the surface of the vehicle glazing panel; and
   pivoting the mobile computing device away from the vehicle glazing panel, wherein at least part of the mobile computing device remains in contact with the vehicle glazing panel.

6. The method according to claim 5, wherein:
   the camera is positioned in a predetermined position relative to the break before the mobile computing device is pivoted.

7. The method according to claim 6, further comprising:
   aligning a feature of the mobile computing device in a predetermined position relative to the break before pivoting the mobile computing device.

8. The method according to claim 7, further comprising:
   aligning an edge of the mobile computing device with the lowest point of the break before pivoting the mobile computing device.

9. The method according to claim 5, further comprising:
   pivoting the mobile computing device until the break is viewable at a predetermined position in a field of view of the camera.

10. The method according to claim 9, wherein:
    the predetermined position is located at or near center of the field of view of the camera.

11. The method according to claim 1, wherein:
the processing of the image uses geometric parameters of the mobile computing device and lens parameters of the camera to estimate a size of the break.

12. The method according to claim 11, wherein:
the geometric parameters of the mobile computing device are used to determine the pivot angle between the mobile computing device and the vehicle glazing panel.

13. The method according to claim 1, wherein:
the processing of the image uses lens parameters for the camera to estimate a size of the break.

14. The method according to claim 1, wherein:
the processing of the image uses geometric parameters for the mobile computing device to estimate a size of the break.

15. The method according to claim 1, wherein:
the processing of the image generates a set of data points which are used to generate a diameter for the break or a zone within the break.

16. The method according to claim 1, wherein:
the processing of the image estimates a size of the break.

17. The method according to claim 16, further comprising:
determining the requirement for a replacement vehicle glazing panel or a repair of the vehicle glazing panel based on the estimated size of the break.

18. The method according to claim 1, wherein:
the processing of the image is further based on chip parameters for at least one of the camera and the mobile computing device.

* * * * *